(12) United States Patent
Huang

(10) Patent No.: US 12,452,750 B2
(45) Date of Patent: Oct. 21, 2025

(54) NEIGHBOR CELL MEASUREMENT CONTROLLING METHOD, APPARATUS AND STORAGE MEDIUM

(71) Applicant: SHENZHEN TRANSSION HOLDINGS CO., LTD., Shenzhen (CN)

(72) Inventor: Junwei Huang, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 517 days.

(21) Appl. No.: 17/994,235

(22) Filed: Nov. 25, 2022

(65) Prior Publication Data

US 2023/0092967 A1    Mar. 23, 2023

Related U.S. Application Data

(63) Continuation of application No. PCT/CN2020/092414, filed on May 26, 2020.

(51) Int. Cl.
*H04W 36/00* (2009.01)
*H04W 24/10* (2009.01)

(52) U.S. Cl.
CPC ....... *H04W 36/0085* (2018.08); *H04W 24/10* (2013.01); *H04W 36/00838* (2023.05)

(58) Field of Classification Search
CPC ....... H04W 36/0085; H04W 36/00838; H04W 36/00; H04W 36/14; H04W 36/30;
(Continued)

(56) References Cited

U.S. PATENT DOCUMENTS 11,792,712 B2 * 10/2023 Tammana ............. H04W 48/12
                                                          370/331
2016/0119834 A1 * 4/2016 Yang .................. H04W 36/247
                                                          455/436
(Continued)

FOREIGN PATENT DOCUMENTS

CN    104186011 A    12/2014
CN    111826177 A    12/2014
(Continued)

OTHER PUBLICATIONS

International Search Report of PCT/CN2020/092414.
(Continued)

*Primary Examiner* — Un C Cho
*Assistant Examiner* — Rasha K Fayed
(74) *Attorney, Agent, or Firm* — J.C. PATENTS

(57) ABSTRACT

An embodiment of present application provides a neighbor cell measurement controlling method, apparatus, and storage medium, where this method comprises that: a terminal device determines whether to update relaxed measurement information, where the updating the relaxed measurement information is used to reduce a difference between a threshold corresponding to the relaxed measurement information and a threshold corresponding to cell reselection information, and then, determines whether to perform a neighbor cell measurement according to a serving cell measurement result and at least one of the determination result and a cell reselection information. The present application can avoid the terminal device staying in the current serving cell for a long time due to a relative large threshold difference or not in accordance with the actual situation, thus facilitating the network planning.

11 Claims, 5 Drawing Sheets

(58) Field of Classification Search
CPC ......... H04W 36/0094; H04W 36/0058; H04W 36/0069; H04W 36/00835; H04W 36/00692; H04W 36/04; H04W 36/08; H04W 36/322; H04W 36/1443; H04W 36/247; H04W 24/10; H04W 24/08; H04W 24/02; H04W 52/0245; H04W 52/02; H04W 52/0212; H04W 52/0238; H04W 52/0229; H04W 52/0258; H04W 16/18; H04W 28/08; H04W 48/12; H04W 48/16; H04W 48/20; H04W 48/18; H04W 72/56; H04W 76/27; H04W 76/28; H04W 84/045; H04W 68/005; H04W 68/02; H04B 17/309; Y02D 30/70

See application file for complete search history.

(56) References Cited

U.S. PATENT DOCUMENTS

| | | | | |
|---|---|---|---|---|
| 2020/0221354 | A1* | 7/2020 | Van der Zee | H04W 4/70 |
| 2021/0076275 | A1* | 3/2021 | Yiu | H04W 36/0088 |
| 2021/0105719 | A1* | 4/2021 | Thangarasa | H04W 68/005 |
| 2021/0235344 | A1* | 7/2021 | Jung | H04W 36/32 |
| 2021/0314959 | A1* | 10/2021 | Islam | H04W 24/10 |
| 2022/0007225 | A1* | 1/2022 | Li | H04W 52/0245 |
| 2022/0053350 | A1* | 2/2022 | Chen | H04W 24/08 |
| 2022/0116802 | A1* | 4/2022 | Kim | H04W 76/27 |
| 2022/0167370 | A1* | 5/2022 | Chen | H04L 5/0032 |
| 2022/0182863 | A1* | 6/2022 | Xu | H04W 24/10 |
| 2022/0201523 | A1* | 6/2022 | Lee | H04W 24/08 |
| 2022/0361030 | A1* | 11/2022 | Hviid | H04W 24/10 |
| 2022/0386161 | A1* | 12/2022 | Xie | H04W 36/0088 |
| 2023/0043593 | A1* | 2/2023 | Lee | H04W 24/10 |
| 2023/0078923 | A1* | 3/2023 | Shi | H04W 52/0258 370/311 |
| 2023/0180079 | A1* | 6/2023 | Hwang | H04W 36/0088 455/436 |
| 2023/0239761 | A1* | 7/2023 | Wang | H04W 36/0088 370/331 |

FOREIGN PATENT DOCUMENTS

| | | |
|---|---|---|
| CN | 105612783 A | 5/2016 |
| CN | 108307686 A | 7/2018 |
| WO | WO2016064541 A1 | 4/2016 |
| WO | WO2019194731 A1 | 10/2019 |

OTHER PUBLICATIONS

Notice of Allowance of the parallel application CN202080009610.1.

First Office Action of the parallel application CN202080009610.1.

NPL1: "Correction of SI update of relaxed measurement parameters", 3GPP tsg_ran\wg2_rl2, Apr. 9, 2020, pp. 1-2.

NPL2: "CR on measurement relaxation in Idle mode for UE power saving", 3GPP tsg_ran\wg4_radio, May 15, 2020, pp. 1-8.

NPL3: Vivo "Evaluation on the mobility impact for RRM measurement relaxation", 3GPP TSG-RAN WG2 Meeting #106 R2-1905962 Mar. 5, 2019, the 22th section.

NPL4: Oppo "UE power Consumption Reduction in RRM Measurements", 3GPP TSG-RAN WG1 #96 R1-1902251, Feb. 22, 2019, the second section.

* cited by examiner

NEIGHBOR CELL MEASUREMENT CONTROLLING METHOD, APPARATUS AND STORAGE MEDIUM

CROSS-REFERENCE TO RELATED APPLICATION

This application is a continuation of International Application No. PCT/CN2020/092414, filed on May 26, 2020. The afore-mentioned patent application is hereby incorporated by reference in its entirety.

TECHNICAL FIELD

The embodiments of present application relate to the technology field of communication, and in particular to a neighbor cell measurement controlling method, apparatus and storage medium.

BACKGROUND

The radio resource management (RRM) relaxed measurement function is a function introduced to reduce the power consumption of terminal device. To implement this function, the network device typically transmits relaxed measurement threshold information to the terminal device to active the radio resource management relaxed measurement function. Correspondingly, the terminal device determines whether to perform neighbor cell measurement according to the relaxed measurement threshold information, etc. However, in practical application, the terminal device has the problem of staying in the current serving cell for a long time, which is not conducive to network planning and needs to be improved.

The foregoing content is intended only as an aid to understand the technical solution of the present application and does not represent an admission that the foregoing content is the prior art.

SUMMARY

An embodiment of present application provides a neighbor cell measurement controlling method, apparatus and storage medium to avoid a terminal device staying in the current serving cell for a long time and facilitate the network planning.

In a first aspect, an embodiment of present application provides a neighbor cell measurement controlling method, applied to a terminal device, including following steps:
  S10, determining whether to update relaxed measurement information, where the updating the relaxed measurement information is used to reduce a difference between a threshold corresponding to the relaxed measurement information and a threshold corresponding to cell reselection information;
  S20, determining whether to perform neighbor cell measurement according to a serving cell measurement result and at least one of the determination result and the cell reselection information.

In one possible implementation, the step S10 includes: determining to update the relaxed measurement information if a preset relaxed measurement updating condition is detected in a relaxed measurement.

In one possible implementation, the relaxed measurement information includes N thresholds for different parameters, at least one threshold in the relaxed measurement information after being updated is greater than a threshold for a same parameter in the relaxed measurement information before being updated, where N is an integer greater than or equal to 1.

In one possible implementation, the step S20 includes: S21, updating the relaxed measurement information; S22, determining whether to perform the neighbor cell measurement according to the serving cell measurement result and at least one of the relaxed measurement information after being updated and the cell reselection information.

In one possible implementation, the step S21 can include: updating the relaxed measurement information according to a preset step.

In one possible implementation, the preset step is determined according to a reselection threshold Q.

In one possible implementation, the updating the relaxed measurement information according to the preset step can include: determining an intermediate value according to the preset step; and updating the relaxed measurement information according to the intermediate value.

In one possible implementation, the intermediate value is a product of the preset step and a preset value.

In one possible implementation, the updating the relaxed measurement information according to the intermediate value can include: determining that a sum of a threshold for any parameter in the relaxed measurement information before being updated and the intermediate value is a threshold for the same parameter in the relaxed measurement information after being updated.

In one possible implementation, the relaxed measurement information includes a relaxed measurement power threshold and a relaxed measurement quality threshold; and the method further includes at least one of following:
  updating a relaxed measurement power threshold using a first preset value, where the preset value includes the first preset value;
  updating the relaxed measurement quality threshold using a second preset value, where the preset value includes the second preset value.

In one possible implementation, the first preset value and the second preset value are different.

In one possible implementation, the preset relaxed measurement updating condition includes at least one of following:
  a duration of the relaxed measurement is greater than or equal to a preset duration;
  a network condition of a serving cell meets a preset event triggering condition.

In one possible implementation, after the step S21, the method can further include: determining whether to perform the relaxed measurement according to the serving cell measurement result and at least one of the relaxed measurement information after being updated and the cell reselection information.

In one possible implementation, the method can further include: performing the determination of whether to update the relaxed measurement information if it is determined that the relaxed measurement is performed.

In one possible implementation, the relaxed measurement information includes a relaxed measurement power threshold and a relaxed measurement quality threshold, and/or, the cell reselection information includes a cell reselection power threshold and a cell reselection quality threshold.

In one possible implementation, a relaxed measurement power threshold before being updated is less than the cell reselection power threshold, and/or, a relaxed measurement quality threshold before being updated is less than the cell reselection quality threshold.

In one possible implementation, the step S22 can include at least one of following: determining whether to perform the neighbor cell measurement according to the cell reselection information and the serving cell measurement result if a relaxed measurement power threshold after being updated is greater than or equal to the cell reselection power threshold and a relaxed measurement quality threshold after being updated is greater than or equal to the cell reselection quality threshold, or determining whether to perform the neighbor cell measurement according to the cell reselection power threshold and a relaxed measurement quality threshold after being updated and the serving cell measurement result if a relaxed measurement power threshold after being updated is greater than or equal to the cell reselection power threshold and the relaxed measurement quality threshold after being updated is less than the cell reselection quality threshold, or determining whether to perform the neighbor cell measurement according to the cell reselection quality threshold and a relaxed measurement power threshold after being updated and the serving cell measurement result if the relaxed measurement power threshold after being updated is less than the cell reselection power threshold and a relaxed measurement quality threshold after being updated is greater than or equal to the cell reselection quality threshold, or determining whether to perform the neighbor cell measurement according to a relaxed measurement power threshold after being updated and a relaxed measurement quality threshold after being updated and the serving cell measurement result if the relaxed measurement power threshold after being updated is less than the cell reselection power threshold and the relaxed measurement quality threshold after being updated is less than the cell reselection power threshold.

In one possible implementation, before the step S10, the method can further include: S00, receiving a network configuration parameter, where the network configuration parameter includes control information, which is used to update the relaxed measurement information.

In one possible implementation, the control information includes a preset step, and/or, the network configuration parameter can further include at least one of cell reselection information and relaxed measurement information.

In one possible implementation, the network configuration parameter is carried by a system message.

In one possible implementation, the step S00 includes: receiving the network configuration parameter from a network device in an idle state or in an inactive state.

In a second aspect, an embodiment of present application provide a neighbor cell measurement controlling method, applied to a network device, including: S100, determining a network configuration parameter, where the network configuration parameter includes control information, which is used to update relaxed measurement information; and S200, transmitting the network configuration parameter so that a terminal device which receives the network configuration parameter determines whether to perform a neighbor cell measurement based on the control information.

In one possible implementation, the step of the terminal device determining whether to perform the neighbor cell measurement based on the control information includes: S210: updating the relaxed measurement information; and S220: determining whether to perform the neighbor cell measurement according to a serving cell measurement result and at least one of the relaxed measurement information after being updated and cell reselection information.

In one possible implementation, the updating the relaxed measurement information is used to reduce a difference between a threshold corresponding to the relaxed measurement information and a threshold corresponding to the cell reselection information.

In one possible implementation, the control information includes a preset step.

In one possible implementation, the preset step is determined according to a reselection threshold Q.

In one possible implementation, the network configuration parameter can further include at least one of cell reselection information and relaxed measurement information.

In one possible implementation, the network configuration parameter is carried by a system message.

In a third aspect, an embodiment of present application provides a neighbor cell measurement controlling apparatus, applied to a terminal device, including: a processing module, configured to: determine whether to update relaxed measurement information, where the updating the relaxed measurement information is used to reduce a difference between a threshold corresponding to the relaxed measurement information and a threshold corresponding to cell reselection information; and determine whether to perform neighbor cell measurement according to a serving cell measurement result and at least one of the determination result and the cell reselection information.

In one possible implementation, the processing module, when determining whether to update the relaxed measurement information, is specifically configured to: determine to update the relaxed measurement information if a preset relaxed measurement updating condition is detected in a relaxed measurement.

In one possible implementation, the relaxed measurement information includes N thresholds for different parameters, at least one threshold in the relaxed measurement information after being updated is greater than a threshold for a same parameter in the relaxed measurement information before being updated, where N is an integer greater than or equal to 1.

In one possible implementation, the processing module, when determining whether to perform the neighbor cell measurement according to the serving cell measurement result and at least one of the determination result and the cell reselection information, is specifically configured to: update the relaxed measurement information; and determine whether to perform the neighbor cell measurement according to the serving cell measurement result and at least one of the relaxed measurement information after being updated and the cell reselection information.

In one possible implementation, the processing module, when updating the relaxed measurement information, can specifically be configured to: update the relaxed measurement information according to a preset step.

In one possible implementation, the preset step is determined according to a reselection threshold Q.

In one possible implementation, the processing module, when updating the relaxed measurement information according to the preset step, can specifically be configured to: determine an intermediate value according to the preset step; and update the relaxed measurement information according to the intermediate value.

In one possible implementation, the intermediate value is a product of the preset step and a preset value.

In one possible implementation, the processing module, when updating the relaxed measurement information according to the intermediate value, can specifically be configured to: determine that a sum of a threshold for any parameter in the relaxed measurement information before being updated and the intermediate value is a threshold for a same parameter in the relaxed measurement information after being updated.

In one possible implementation, the relaxed measurement information includes a relaxed measurement power threshold and a relaxed measurement quality threshold, and the processing module is further configured to: updating a relaxed measurement power threshold using a first preset value, where the preset value includes the first preset value; and/or, the processing module is further configured to: update the relaxed measurement quality threshold using a second preset value, where the preset value includes the second preset value.

In one possible implementation, the first preset value and the second preset value are different.

In one possible implementation, the preset relaxed measurement updating condition includes at least one of following:
  a duration of the relaxed measurement is greater than or equal to a preset duration;
  a network condition of a serving cell meets a preset event triggering condition.

In one possible implementation, the processing module, after updating the relaxed measurement information, can further be configured to: determine whether to perform the relaxed measurement according to the serving cell measurement result and at least one of the relaxed measurement information after being updated and the cell reselection information.

In one possible implementation, the relaxed measurement information includes a relaxed measurement power threshold and a relaxed measurement quality threshold, and/or, the cell reselection information includes a cell reselection power threshold and a cell reselection quality threshold.

In one possible implementation, a relaxed measurement power threshold before being updated is less than the cell reselection power threshold, and/or, a relaxed measurement quality threshold before being updated is less than the cell reselection quality threshold.

In one possible implementation, the processing module can further be configured to: determine whether to perform the neighbor cell measurement according to the cell reselection information and the serving cell measurement result when a relaxed measurement power threshold after being updated is greater than or equal to the cell reselection power threshold and a relaxed measurement quality threshold after being updated is greater than or equal to the cell reselection quality threshold, or
  determine whether to perform the neighbor cell measurement according to the cell reselection power threshold and a relaxed measurement quality threshold after being updated and the serving cell measurement result when a relaxed measurement power threshold after being updated is greater than or equal to the cell reselection power threshold and the relaxed measurement quality threshold after being updated is less than the cell reselection quality threshold, or
  determine whether to perform the neighbor cell measurement according to the cell reselection quality threshold and a relaxed measurement power threshold after being updated and the serving cell measurement result when the relaxed measurement power threshold after being updated is less than the cell reselection power threshold and a relaxed measurement quality threshold after being updated is greater than or equal to the cell reselection quality threshold, or
  determine whether to perform the neighbor cell measurement according to a relaxed measurement power threshold after being updated and a relaxed measurement quality threshold after being updated and the serving cell measurement result when the relaxed measurement power threshold after being updated is less than the cell reselection power threshold and the relaxed measurement quality threshold after being updated is less than the cell reselection power threshold.

In one possible implementation, the neighbor cell measurement controlling apparatus further includes a receiving module, configured to receive, before the processing module updates the relaxed measurement information, a network configuration parameter, where the network configuration parameter includes control information, which is used to update the relaxed measurement information.

In one possible implementation, the control information includes a preset step.

In one possible implementation, the network configuration parameter can further include at least one of cell reselection information and relaxed measurement information.

In one possible implementation, the network configuration parameter is carried by a system message.

In one possible implementation, the receiving module is specifically configured to: receive the network configuration parameter from a network device in an idle state or in an inactive state.

In a fourth aspect, an embodiment of present application provide a neighbor cell measurement controlling apparatus, applied to a network device, including: a processing module, configured to: determine a network configuration parameter, where the network configuration parameter includes control information, which is used to update relaxed measurement information; and a transmitting module, configured to transmit the network configuration parameter so that a terminal device which receives the network configuration parameter determines whether to perform a neighbor cell measurement based on the control information.

In one possible implementation, the step of the terminal device determining whether to perform the neighbor cell measurement based on the control information includes: S210: updating the relaxed measurement information; and S220: determining whether to perform the neighbor cell measurement according to a serving cell measurement result and at least one of the relaxed measurement information after being updated and cell reselection information.

In one possible implementation, the updating the relaxed measurement information is used to reduce a difference between a threshold corresponding to the relaxed measurement information and a threshold corresponding to the cell reselection information.

In one possible implementation, the control information includes a preset step.

In one possible implementation, the preset step is determined according to a reselection threshold Q.

In one possible implementation, the network configuration parameter can further include at least one of cell reselection information and relaxed measurement information.

In one possible implementation, the network configuration parameter is carried by a system message.

In a fifth aspect, an embodiment of present application provides a communication device including: a memory and a processor.

the memory is used to store program instruction;
the processor is used to call program instruction in the memory to perform the method as described in any one of the first aspect or the method as described in any one of the second aspect.

In a sixth aspect, an embodiment of present application provides a communication system, including:

a terminal device for implementing any one of the first aspects; and
a network device for implementing any one of the second aspect.

In a seventh aspect, an embodiment of present application provides a readable storage medium, where the readable storage medium stores a computer program stored thereon; the computer program, when being executed, implements the method as described in any one of the first aspect or the method as described in any one of the second aspect.

In an eighth aspect, an embodiment of present application further provides a program product, the program product includes a computer program, the computer program is stored in a readable storage medium, the processor can read the computer program from the readable storage medium, and the processor executes the computer program to implement a method as described in any one of the first aspect or any one of the second aspect.

An embodiment of present application provides a neighbor cell measurement controlling method, apparatus, and storage medium. First, the terminal device determines whether to update relaxed measurement information, where the updating the relaxed measurement information is used to reduce a difference between a threshold corresponding to the relaxed measurement information and a threshold corresponding to cell reselection information, and then, determines whether to perform a neighbor cell measurement according to a serving cell measurement result and at least one of the determination result and a cell reselection information. Because the updating the relaxed measurement information is used to reduce the difference between the threshold corresponding to the relaxed measurement information and the threshold corresponding to the cell reselection information, it can avoid the terminal device staying in the current serving cell for a long time due to a relative large threshold difference or not in accordance with the actual situation, thus facilitating the network planning.

DESCRIPTION OF EMBODIMENTS

It should be understood that the "and/or" involved in embodiments of present application describing the association relationship of the associated objects, indicates that three relationships can exist, for example, A and/or B, which can indicate: the presence of A alone, the presence of both A and B, and the presence of B alone, where A, B can be singular or plural. The character "/" generally indicates an "or" relationship between the associated context objects.

In addition, the step codes such as S10, S20, S100, S200, etc. involved in embodiments of the present application are for the purpose of expressing the corresponding steps more clearly, and do not constitute a substantial limitation on the order, and the person skilled in the art can perform S20 before S10, etc. in the specific implementation, but these shall be within the scope of protection of the present application.

First, the application scenarios and some of the vocabulary involved in examples of present application are introduced.

Figure 1:
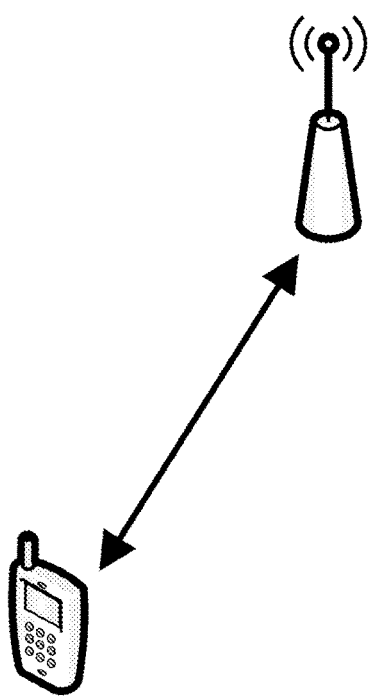
FIG. 1 is a schematic diagram of a communication system provided by an embodiment of present application.

FIG. 1 is a schematic diagram of the communication system provided by an embodiment of present application. As shown in FIG. 1, the communication system includes network device and terminal device, where the terminal device is within the coverage area of the network device and communicates with the network device to implement the technical solution provided by each of the following embodiments of present application.

A network device, also known as a radio access network (RAN) device, is a device that connects a terminal device to a wireless network, which can be an evolutional base station (evolutional node B, eNB or eNodeB) in a long term evolution (LTE) system, or a relay station or access point, or a base station in a 5G network, such as a transmission and reception point (TRP), or a controller, which is not limited herein. In one possible way, the network device can be a base station (e.g. gNB) with separate architecture of CU and DU.

Terminal device can be either a wireless terminal device or a wired terminal device. A wireless terminal device can be a device with wireless transceiving function, which can be deployed on land, including indoor or outdoor, handheld or vehicle-mounted; or can be deployed on water surface (e.g., ships, etc.); and also can be deployed in the air (e.g., on aircraft, balloons, and satellites, etc.). The terminal device can be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, and so on, which is not limited herein. It is understood that in embodiments of present application, the terminal device can also be referred to as a user equipment (UE).

In a 5G mobile communication system, the states which the terminal device is in include: connected state, idle state, inactive state. A terminal device, when it is in the connected state, establishes an air interface connection with the network device and communicates with the network device based on the air interface connection. When the terminal device is in the idle state, the air interface connection between the terminal device and the network device is disconnected, and the context information is no longer saved, and the terminal device can only receive broadcast information transmitted by the network device. When the terminal device is in inactive state, the air interface connection between the terminal device and the network device is disconnected, but the context information continues to be saved. When the terminal device enters the connected state from the inactive state, it can quickly recover to the connected state based on the saved context information.

For a terminal device with the radio resource management relaxed measurement function being active, it can determine whether to perform neighbor cell measurement according to the serving cell measurement result, and the relaxed measurement information and cell reselection information configured by the network device. In this process, the inventor's research found that when the threshold corresponding to the relaxed measurement information configured for the terminal device by the serving cell of the terminal device is smaller than the threshold corresponding to the cell reselection information, and the difference is relative large or does not match the actual situation, it will cause the terminal device to stay in the current serving cell for a long time and will not try to reside in other higher priority cells, which in turn can lead to the terminal device not being able to select higher priority neighbor cells, or not being able to obtain better service or does not comply with the network planning (inter base station load balancing).

For example, taking the reference signal received power (RSRP) as the judgment basis, the network device configures a cell reselection power threshold of 50 dB ($S_{IntraSearchP}=25$), a relaxed measurement power threshold of 30 dB ($S_{searchThresholdP}=15$) for the terminal device, and the terminal device's measurement result ($S_{rxlev}$) for the serving cell is 39~49 dB for a long time, which results in the terminal device stays in the current serving cell for a long time.

Another example, taking the reference signal received quality (RSRQ) as the judgment basis, when the network device configures a cell reselection quality threshold of 25 dB ($S_{IntraSearchQ}=25$), a relaxed measurement quality threshold of 15 dB ($S_{searchThresholdP}=15$) for the terminal device, and the terminal device's measurement result ($S_{qual}$) for the serving cell is 19~24 dB for a long time, which results in the terminal device stays in the current serving cell for a long time.

For serving cell measurement result, $S_{rxlev}$ and $S_{qual}$, it can be understood that:

$$Srxlev=Q_{rxlevmeas}-(Q_{rxlevmin}+Q_{rxlevminoffset})-P_{compensation}-Qoffset_{temp}$$

$$Squal=Q_{qualmeas}-(Q_{qualmin}+Q_{qualminoffset})-Qoffset_{temp}$$

where:

$Q_{rxlevmeas}$ indicates the measured cell reference signal received power of the serving cell;

$Q_{rxlevmin}$ indicates the minimum access requirement for cell reference signal received power of the serving cell;

$Q_{rxlevminoffset}$ indicates the minimum access demand compensation for cell reference signal received power of the serving cell;

$P_{compensation}$ indicates uplink transmitted power compensation value;

$Qoffset_{temp}$ indicates temporary compensation value;

$Q_{qualmeas}$ indicates the measured cell reference signal received quality of the serving cell;

$Q_{qualmin}$ indicates the minimum access requirement for cell reference signal received quality of the serving cell;

$Q_{qualminoffset}$ indicates the minimum access demand compensation for cell reference signal received quality of the serving cell.

Each of the symbols has the same meaning as the prior art, which will not be repeated herein.

According to the above issues, the present application proposes: dynamically adjusting the relaxed measurement information to reduce the inter-threshold difference. This not only solves the above problems, but also allows network devices to be more flexible in configuring relaxed measurement information.

Figure 2:
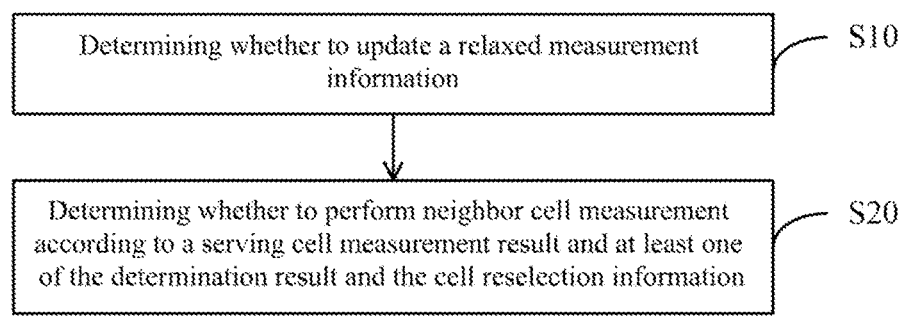
FIG. 2 is a flow chart of a neighbor cell measurement controlling method provided by an embodiment of present application.

FIG. 2 is a flow chart of the neighbor cell measurement controlling method provided by an embodiment of present application. An embodiment of present application provides a neighbor cell measurement controlling method, which is applied to a terminal device. As shown in FIG. 2, the method of the present embodiment includes the following steps.

S10, determining whether to update relaxed measurement information.

The updating the relaxed measurement information is used to reduce a difference between a threshold corresponding to the relaxed measurement information and a threshold corresponding to cell reselection information.

S20, determining whether to perform neighbor cell measurement according to a serving cell measurement result and at least one of the determination result and the cell reselection information.

Figure 3:
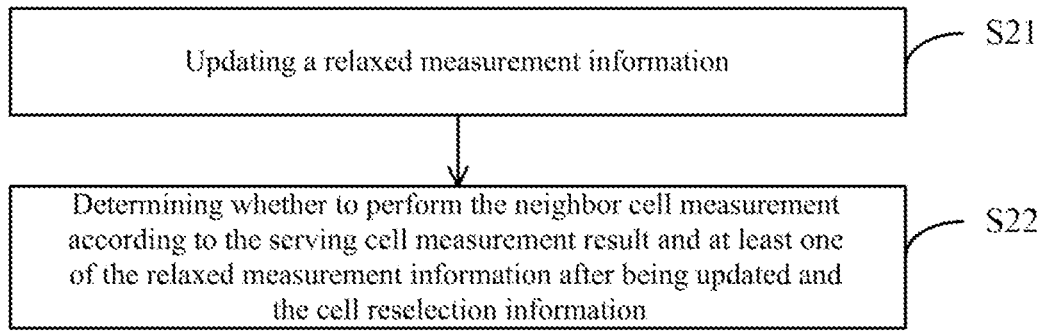
FIG. 3 is an exploded view of the step S20 shown in FIG. 2.

When the determination result is to update the relaxed measurement information, as shown in FIG. 3, this step can include:

S21, updating the relaxed measurement information.

S22, determining whether to perform the neighbor cell measurement according to the serving cell measurement result and at least one of the relaxed measurement information after being updated and the cell reselection information.

If the determination result is not to update the relaxed measurement information, the solution is the same as that in the prior art, which will not be repeated herein.

In an embodiment of present application, first, the terminal device determines whether to update relaxed measurement information, where the updating the relaxed measurement information is used to reduce a difference between a threshold corresponding to the relaxed measurement information and a threshold corresponding to cell reselection information, and then, determines whether to perform a neighbor cell measurement according to a serving cell measurement result and at least one of the determination result and a cell reselection information. Because the updating the relaxed measurement information is used to reduce the difference between the threshold corresponding to the relaxed measurement information and the threshold corresponding to the cell reselection information, it can avoid the terminal device staying in the current serving cell for a long time due to a relative large threshold difference or not in accordance with the actual situation, and make the terminal device selecting a higher priority neighbor cell or obtaining better service, which is more conducive to the network planning (inter base station load balancing).

In one possible implementation, the S10 step can include: determining to update the relaxed measurement information if a preset relaxed measurement updating condition is detected in a relaxed measurement.

For the preset relaxed measurement updating condition, it is understood by the person skilled in the art that they can occur periodically or non-periodically, depending on practical needs. Exemplarily, the preset relaxed measurement updating condition can include at least one of the following:
  a duration of the relaxed measurement is greater than or equal to a preset duration;
  a network condition of a serving cell meets a preset event triggering condition.

Specifically:
  if the duration of the terminal device performing the relaxed measurement is longer than or equal to the preset duration, it is determined that the terminal device stays in the current serving cell for a long time, and the relaxed measurement information needs to be updated at this time. The size of the preset duration can be set according to historical experience or actual needs.

As for the network condition of the serving cell meets the preset event triggering condition, it can be a throughput is less than a set value, etc., which is not limited by embodiment of present application.

Optionally, the relaxed measurement information includes N thresholds for different parameters, at least one threshold in the relaxed measurement information after being updated is greater than a threshold for a same parameter in the relaxed measurement information before being updated, where N is an integer greater than or equal to 1.

Because at least one threshold in the relaxed measurement information after being updated is greater than the threshold of the same parameter in the relaxed measurement information before being updated, which corresponds to that this updating operation increases the threshold of at least one parameter, this step can reduce the difference between the threshold corresponding to the relaxed measurement information and the threshold corresponding to the cell reselection information.

Typically, the relaxed measurement information can include a relaxed measurement power threshold ($S_{searchThresholdP}$, hereinafter abbreviated as $S_{sP}$) and a relaxed measurement quality threshold ($S_{searchThresholdQ}$, hereinafter abbreviated as $S_{sQ}$). Herein, N equals 2 and the relaxed measurement information includes thresholds for 2 different parameters, the relaxed measurement power threshold after being updated is greater than the relaxed measurement power threshold before being updated, and/or, the relaxed measurement quality threshold after being updated is greater than the relaxed measurement quality threshold before being updated. In practice application, each time for updating the relaxed measurement information can update only the relaxed measurement quality threshold or the relaxed measurement power threshold, or, alternatively, update both the relaxed measurement quality threshold and the relaxed measurement power threshold, depending on the actual requirements.

Further, the cell reselection information can include a cell reselection power threshold ($S_{IntraSearchP}$, hereinafter abbreviated as $S_{IP}$) and a cell reselection quality threshold ($S_{IntraSearchQ}$, hereinafter abbreviated as $S_{IQ}$).

Optionally, the range of values for both the cell reselection power threshold ($S_{IP}$) and the relaxed measurement power threshold ($S_{sP}$) are determined according to the reselection threshold P (ReselectionThresholdP). The meaning of the reselection threshold P can be referred to the related technology.

Optionally, the range of values for both the cell reselection quality threshold ($S_{IQ}$) and the relaxed measurement quality threshold ($S_{sQ}$) are determined according to the reselection threshold Q (ReselectionThresholdQ). The meaning of the reselection threshold Q can be referred to the related technology.

Further, for reducing the difference between the threshold corresponding to the relaxed measurement information and the threshold corresponding to the cell reselection information, at least one of the following three meanings can be included:
  1. Reducing only the difference between the relaxed measurement power threshold and the cell reselection power threshold;
  2. Reducing only the difference between the relaxed measurement quality threshold and the cell reselection quality threshold;
  3. Reducing the difference between the relaxed measurement power threshold and the cell reselection power threshold, and at the same time, reducing the difference between the relaxed measurement quality threshold and the cell reselection quality threshold.

The serving cell measurement result can include S-criterion (Srxlev) dominated by the reference signal received power and S-criterion (Squal) dominated by the reference signal received quality. Exemplarily, when the reference signal received power is less than or equal to the cell reselection power threshold, the reference signal received quality is less than or equal to the cell reselection quality threshold, the reference signal received power is greater than or equal to the relaxed measurement power threshold, and the reference signal received quality is greater than or equal to the relaxed measurement quality threshold, the terminal device determines not to perform the neighbor cell measurement, i.e., the terminal device performs the relaxed measurement, thus, after the step S21, the method can further include: determining whether to perform the relaxed measurement according to the serving cell measurement result and at least one of the relaxed measurement information after being updated and the cell reselection information corresponding to the serving cell. When the reference signal received power is less than or equal to the cell reselection power threshold, the reference signal received quality is less than or equal to the cell reselection quality threshold, the reference signal received power is less than or equal to the relaxed measurement power threshold, and the reference signal received quality is less than or equal to the relaxed measurement quality threshold, the terminal device determines to perform the neighbor cell measurement.

In the present embodiment, first, the terminal device determines to update the relaxed measurement information when a preset relaxed measurement updating condition is detected in the relaxed measurement, and then, updating the relaxed measurement information, where the relaxed measurement information includes N thresholds for different parameters, at least one threshold in the relaxed measurement information after being updated is greater than a threshold for a same parameter in the relaxed measurement information before being updated, and where N is an integer greater than or equal to 1. Finally, determining whether to perform neighbor cell measurement according to a serving cell measurement result and at least one of relaxed measurement information after being updated and cell reselection information. Because at least one threshold in the relaxed measurement information after being updated is greater than the threshold of the same parameter in the relaxed measurement information before being updated, which corresponds to that this update operation increase the threshold of at least one parameter, this step reduces the difference between the threshold corresponding to the relaxed measurement information and the threshold corresponding to the cell reselection information, and avoids the terminal device staying in the current serving cell for a long time due to a relative large difference in the threshold or not in accordance with the actual situation, thus facilitating the network planning.

Based on the above embodiments, as an alternative, the step S21 can include: updating the relaxed measurement information according to a preset step. Optionally, the preset step is determined according to a reselection threshold Q. Alternatively, the preset step can be a custom specific value, such as 1 dB, 2 dB, 3 dB, etc.

This embodiment updates the relaxed measurement information based on a preset step, such that each update operation produces a relatively fixed change in the relaxed measurement information, and regularly changes the relaxed measurement information.

In some examples, when the preset step is relative small, the relaxed measurement information can be updated multiple times in succession, for example updating the relaxed measurement information for five consecutive times, and after updating for the fifth time then performing a determination of whether to perform neighbor cell measurement according to the relaxed measurement information after being updated, cell reselection information and serving cell measurement result. During the process for updating the relaxed measurement information, the terminal device can still perform relaxed measurement, which can reduce the power consumption of the terminal device.

Further, the updating the relaxed measurement information according to the preset step can include: determining an intermediate value according to the preset step; and updating the relaxed measurement information according to the intermediate value. Optionally, the intermediate value is a product of the preset step and a preset value, where the updating the relaxed measurement information according to the intermediate value can include: determining that a sum of a threshold for any parameter in the relaxed measurement information before being updated and the intermediate value is a threshold for a same parameter in the relaxed measurement information after being updated.

Optionally, the method can further include: updating a relaxed measurement power threshold using a first preset value, where the preset value includes the first preset value; and/or, updating a relaxed measurement quality threshold using a second preset value, where the preset value includes the second preset value.

For example, the relaxed measurement power threshold before being updated is denoted as $S_{sP1}$, the relaxed measurement power threshold after being updated is denoted as $S_{sP2}$, the relaxed measurement quality threshold before $S_{sQ1}$, the relaxed measurement being updated is denoted as $S_{sQ1}$, the relaxed measurement quality threshold after being updated is denoted as $S_{sQ2}$, and the preset step is denoted as $S_0$, then:

$$S_{sP2}=S_{sP1}+2*S_0$$

$$S_{sQ2}=S_{sQ1}+S_0$$

Figure 4A:
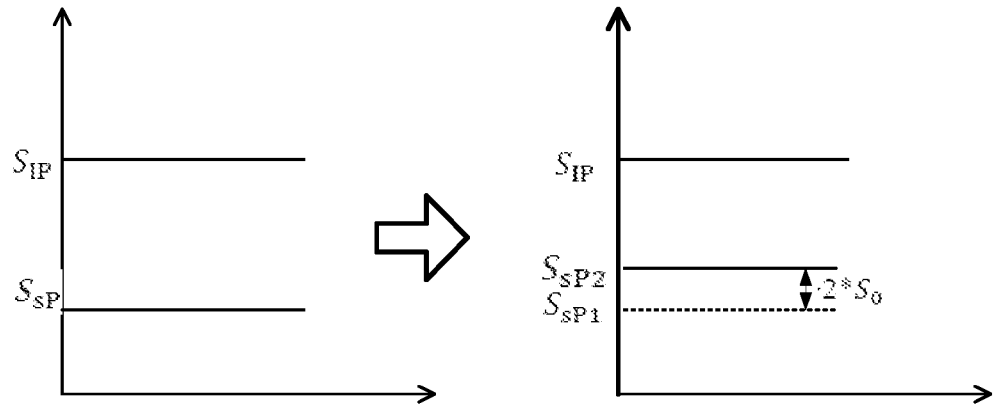
FIG. 4a and FIG. 4b are diagrams for a comparison between relaxed measurement information before being updated and relaxed measurement information after being updated provided by an embodiment of present application.
Figure 4B:
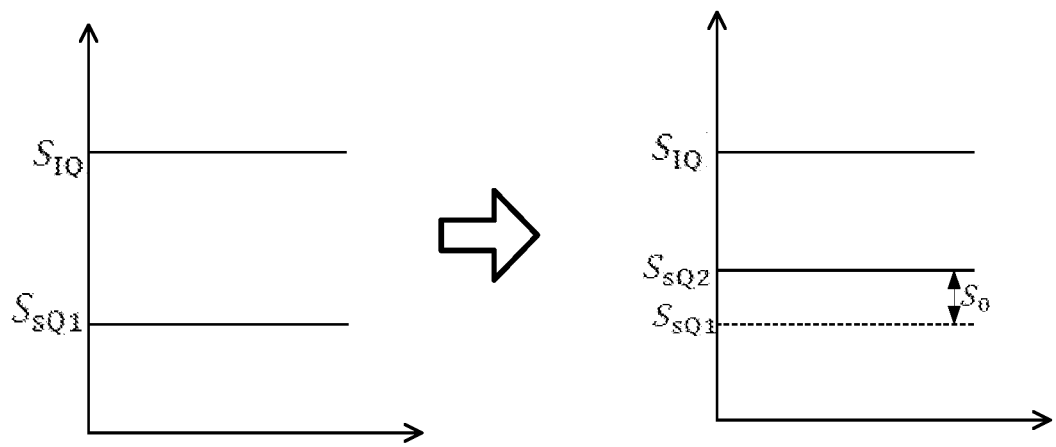

For the relaxed measurement power threshold, the first preset value is 2 and the intermediate value is $2*S_0$; for the relaxed measurement quality threshold, the second preset value is 1 and the intermediate value is $S_0$. It can be seen that the first preset value used for updating the relaxed measurement power threshold and the second preset value used for updating the relaxed measurement quality threshold can be different. A comparison between threshold before being updated and threshold after being updated can refer to FIG. 4a and FIG. 4b.

Still taking the reference signal received power (RSRP) as basis of judgment, the network device configures a cell reselection power threshold of 50 dB ($S_{1P}$=25), a relaxed measurement power threshold of 30 dB ($S_{sP}$=15), a preset step of 2 dB ($2*S_0$=1) for the terminal device, the terminal device's measurement result ($S_{rxlev}$) for the serving cell is 39~49 dB for a long time. Taking the reference signal received quality (RSRQ) as the basis of judgment, when the network device configures a cell reselection quality threshold of 25 dB ($S_{1Q}$=25), a relaxed measurement quality threshold of 15 dB ($S_{sQ}$=15), preset step of 1 dB ($S_0$=1) for terminal device, the terminal device's measurement result for the serving cell ($S_{qual}$) is 19 dB~24 dB for a long time. After five increments of relaxed measurement information: $S_{sP}$=40 dB and $S_{sQ}$=20 dB, the measurement interval of the terminal device can be entered. At this time, when the serving cell measurement result is: the reference signal received power is 39 dB ($S_{rxlev}$=39 dB), the reference signal received quality is 19 dB ($S_{qual}$=19 dB), the measurement of neighbor cell can be performed and the cell reselection process can be performed.

In the embodiment, if it is determined that the terminal device performs a relaxed measurement, the terminal device performs S10 for determining whether to update relaxed measurement information, that is, the terminal device repeats S10 to S20.

It is emphasized again that the relaxed measurement power threshold before being updated is less than the cell reselection power threshold, the relaxed measurement quality threshold before being updated is less than the cell reselection quality threshold, while the relaxed measurement power threshold after being updated and the relaxed measurement quality threshold after being updated exists the following several conditions:

Condition 1, the relaxed measurement power threshold after being updated is less than the cell reselection power threshold, and the relaxed measurement quality threshold after being updated is less than the cell reselection quality threshold;

Condition 2, the relaxed measurement power threshold after being updated is greater than or equal to the cell reselection power threshold, and the relaxed measurement quality threshold after being updated is less than the cell reselection quality threshold;

Condition 3, the relaxed measurement power threshold after being updated is less than the cell reselection power threshold, and the relaxed measurement quality threshold after being updated is greater than or equal to the cell reselection quality threshold;

Condition 4, the relaxed measurement power threshold after being updated is greater than or equal to the cell reselection power threshold, and the relaxed measurement quality threshold after being updated is greater than or equal to the cell reselection quality threshold.

For the Condition 1, Condition 2 and Condition 3 described above, the terminal device determines to perform the relaxed measurement, and then returns to perform S10, where, for Condition 2 and Condition 3, the terminal device, when the updating the relaxed measurement information is performed, updates the relaxed measurement quality threshold and the relaxed measurement power threshold, respectively, that is, when the relaxed measurement power threshold after being updated is greater than or equal to the cell reselection power threshold, there is no further updating for the relaxed measurement power threshold, and when the relaxed measurement quality threshold after being updated is greater than or equal to the cell reselection quality threshold, there is no further updating for the relaxed measurement quality threshold; for Condition 4 described above, the terminal device determines whether to perform neighbor cell measurement according to the cell reselection information and the serving cell measurement result.

Figure 5A:
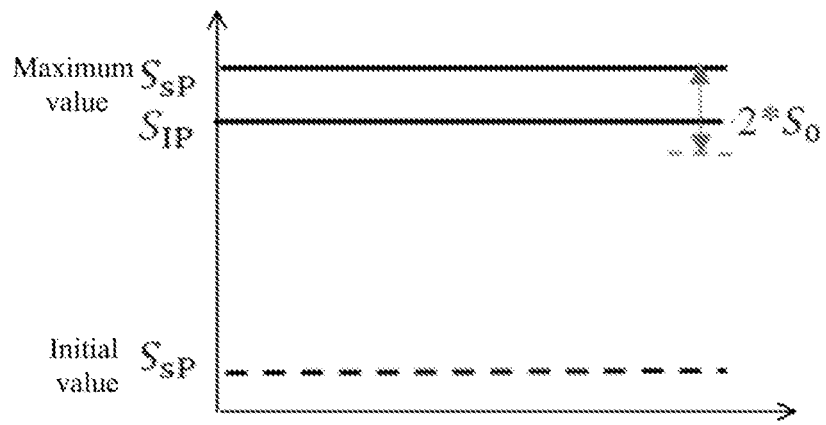
FIG. 5a and FIG. 5b are schematic diagrams of a maximum value of a threshold corresponding to the relaxed measurement information provided by an embodiment of present application.
Figure 5B:
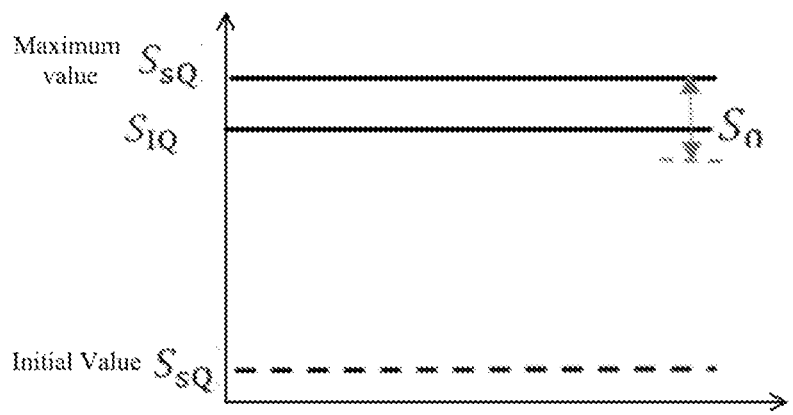

In addition, the person skilled in the art can understand that because the relaxed measurement power threshold before being updated is less than the cell reselection power threshold, when the update is performed at a preset step as basis, even though the relaxed measurement power threshold is updated all the time, the difference between its maximum value and the cell reselection power threshold is less than the middle value when updating the relaxed measurement power threshold, as shown in FIG. 5a. Similarly, the difference between the maximum value of the relaxed measurement quality threshold and the cell reselection quality threshold is less than the middle value when updating the relaxed measurement quality threshold, as shown in FIG. 5b. The specific meaning of the symbols can be found in the previous section, which will not be repeated herein.

Figure 6:
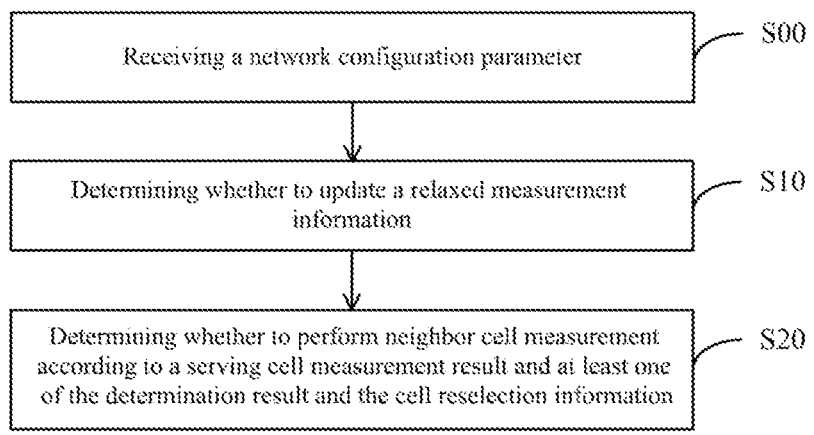
FIG. 6 is a flow chart of a neighbor cell measurement controlling method provided by another embodiment of present application.

In some embodiments, as shown in FIG. 6, on the basis of the process shown in FIG. 2, before the step S10, the neighbor cell measurement controlling method can further include: S00, receiving a network configuration parameter.

Figure 7:
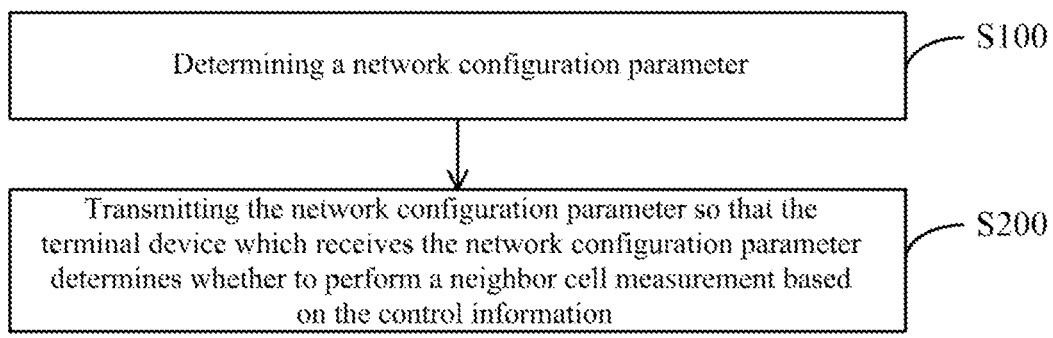
FIG. 7 is a flow chart of a neighbor cell measurement controlling method provided by a yet another embodiment of present application.

Correspondingly, referring to FIG. 7, the network device performs the following steps.

S100, determining a network configuration parameter.

The network configuration parameter includes control information, which is used to update relaxed measurement information;

S200, transmitting the network configuration parameter so that a terminal device which receives the network configuration parameter determines whether to perform a neighbor cell measurement based on the control information.

Optionally, the control information can include a preset step.

Further, the network configuration parameter includes cell reselection information and/or relaxed measurement information.

For a terminal device in the idle state, or a terminal device in the inactive state, the network configuration parameter from the network device can be received.

As an option way, this network configuration parameter is carried by a system message.

The aforementioned relaxed measurement information, cell reselection information, and preset relaxed measurement updating condition can be carried by a system message. The terminal device performs a relaxed measurement after receiving a system message, and the network device controls or configures the accessed terminal device to perform the relaxed measurement by transmitting a system message.

Specifically, the system message can be system message 2 (system information block 2, system information block type 2, SIB2) or system message 3 (system information block 3, system information block type 3, SIB3) or any other system message, which is not limited by embodiment of present application.

It is understood that the operations and steps implemented by the terminal device in each of the embodiments can also be implemented by components (e.g., chips or circuits) that can be used in the terminal device, and which is not limited by embodiment of present application. The operations and steps implemented by the network device can also be implemented by components (e.g., chips or circuits) that can be used in the network device, and which is not limited by embodiment of present application.

Figure 8:
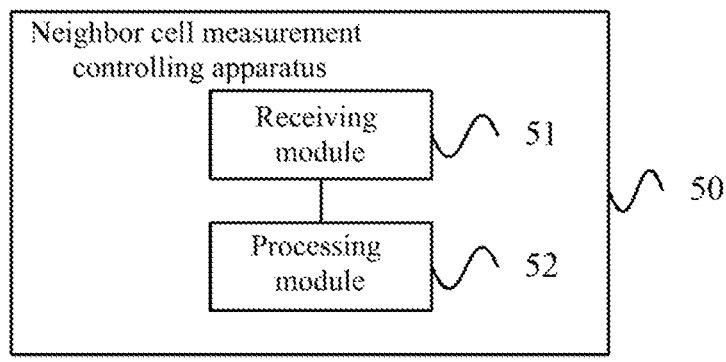
FIG. 8 is a schematic diagram of a structure of a neighbor cell measurement controlling apparatus provided by an embodiment of present application.

FIG. 8 is a schematic diagram of a structure of a neighbor cell measurement controlling apparatus provided by an embodiment of present application. As shown in FIG. 8, the neighbor cell measurement controlling apparatus 50 can be a terminal device, also can be a component of a terminal device (e.g., an integrated circuit, a chip, etc.), or can be another communication module, for implementing the operation corresponding to the terminal device in any of the embodiments. The neighbor cell measurement controlling apparatus 50 of the present embodiment includes: a receiving module 51 and a processing module 52. The neighbor cell measurement controlling apparatus 50 of the present embodiment can implement the solution of the terminal device as in any of the embodiments through the receiving module 51 and the processing module 52 with similar implementation principles and technical effects, which will not be repeated herein.

Figure 9:
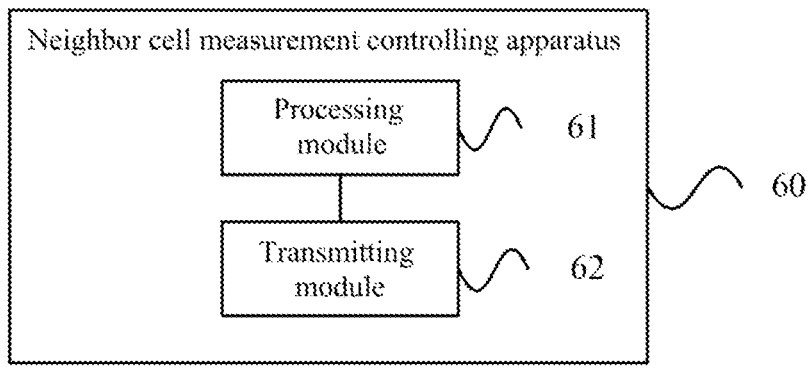
FIG. 9 is a schematic diagram of a structure of a neighbor cell measurement controlling apparatus provided by another embodiment of present application.

FIG. 9 is a schematic diagram of a structure of a neighbor cell measurement controlling apparatus provided by another embodiment of present application. As shown in FIG. 9, the neighbor cell measurement controlling apparatus 60 can be a network device, also can be a component of a network device (e.g., an integrated circuit, a chip, etc.), or can be another communication module, for implementing the operation corresponding to the network device in any of the embodiments. The neighbor cell measurement controlling apparatus 60 of the present embodiment includes: a processing module 61 and a transmitting module 62. The neighbor cell measurement controlling apparatus 60 of the present embodiment can implement the solution of the network device as in any of the embodiments through the processing module 61 and the transmitting module 62 with similar implementation principles and technical effects, which will not be repeated herein.

Figure 10:
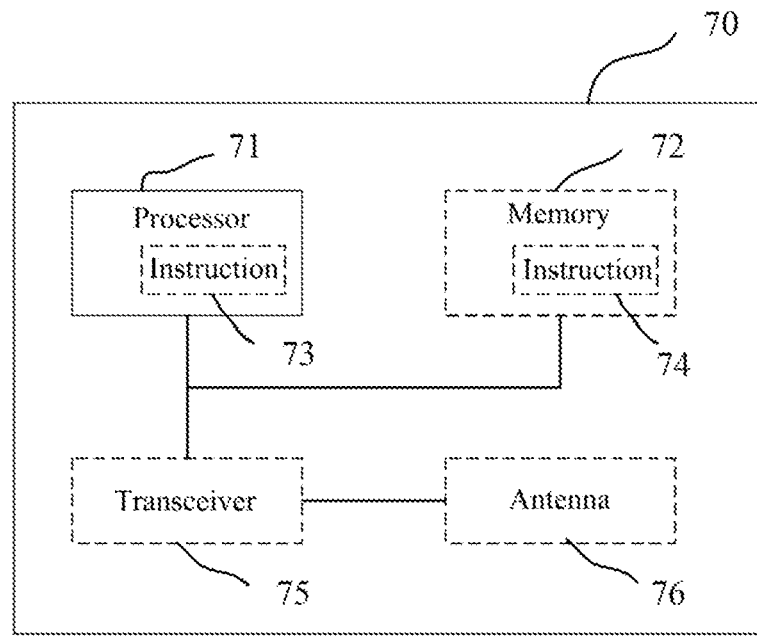
FIG. 10 is a schematic diagram of a structure of a communication device provided by an embodiment of present application.

FIG. 10 is a schematic diagram of a structure of a communication device provided by an embodiment of present application. As shown in FIG. 10, the communication device 70 described in the present embodiment can be a terminal device (or a component that can be used in a terminal device) or a network device (or a component that can be used in a network device) as mentioned in the previous method embodiment. The communication device 70 can be used to implement the method described in the above method embodiment corresponding to a terminal device or a network device, referring to the illustration in the method embodiments for details.

The communication device 70 can include one or more processor 71, where the processor 71 can also be referred to as processing unit and can implement certain control or processing function. The processor 71 can be a general purpose processor or a dedicated processor, etc. For example, it can be a baseband processor, or a central processor. The baseband processor can be used to process the communication protocol and the communication data, and the central processor can be used to control the communication device, execute the software program, and process the data of the software program.

In one possible design, the processor 71 can also store instruction 73 or data (e.g., intermediate data). The instruction 73 can be run by the processor 71 to cause the communication device 70 to perform the method described in the above method embodiment corresponding to the terminal device or network device.

In yet another possible design, the communication device 70 can include circuit that can implement the functions of transmitting or receiving or communicating in the preceding method embodiments.

In one possible implementation, the communication device 70 can include one or more memory 72 on which instruction 74 can be stored, where the instruction can be run on the processor 71 to cause the communication device 70 to perform the method described in the above method embodiment.

In one possible implementation, the memory 72 can also have data stored thereon. The processor 71 and memory 72 can be set up separately or integrated together.

In one possible implementation, the communication device 70 can also include a transceiver 75 and/or an antenna 76. The processor 71 can be called a processing unit that controls the communication device 70 (terminal device or core network device or radio access network device). The transceiver 75 can be referred to as a transceiving unit, transceiver, transceiving circuit, or transceiving device, etc., for implementing the transceiving function of the communication device 70.

In one design, if the communication device 70 is used to implement operations corresponding to the terminal device in each of embodiments, for example, the network configuration parameter transmitted by the network device can be received by the transceiver 75. It is determined by processor 71 whether to update the relaxed measurement information, where the updating the relaxed measurement information is used to reduce the difference between the threshold corresponding to the relaxed measurement information and the threshold corresponding to the cell reselection information, and determining whether to perform neighbor cell measurement according to the determining result, the cell reselection information and the serving cell measurement result.

The specific implementation process of the processor 71 and the transceiver 75 can be seen in the relevant descriptions of each of the above embodiments, which will not be repeated herein.

In another design, if the communication device 70 is used to implement operation corresponding to the network device in each of embodiments, for example: network configuration parameter can be determined by the processor 71, where the network configuration parameter includes a preset step. The network configuration parameter can be broadcast by the transceiver 75 to cause the terminal device receiving the network configuration parameter, when the updating the relaxed measurement information is determined, to update the relaxed measurement information according to a preset step, and to determine whether to perform a neighbor cell measurement according to the relaxed measurement information after being updated, the cell reselection information and the serving cell measurement result, where the updating the relaxed measurement information is used to reduce the difference between the threshold corresponding to the relaxed measurement information and the threshold corresponding to the cell reselection information.

The specific implementation process of the processor 71 and the transceiver 75 can be referred to the relevant descriptions of each of embodiments, which will not be repeated herein.

The processor 71 and transceiver 75 described in the present application can be implemented on integrated circuit (IC), analog IC, radio frequency integrated circuit (RFIC), mixed-signal IC, application specific integrated circuit (ASIC), printed circuit board (PCB), electronic device, etc. The processor 71 and transceiver 75 can also be fabricated using various IC process technologies, such as complementary metal oxide semiconductor (CMOS), nMetal-oxide-semiconductor (NMOS), positive channel metal oxide semiconductor (PMOS), Bipolar Junction Transistor (BJT), bipolar CMOS (BiCMOS), silicon germanium (SiGe), gallium arsenide (GaAs), etc.

Although in the description of the embodiment, the neighbor cell measurement controlling apparatus is described by taking a terminal device or a network device as an example, the scope of the neighbor cell measurement controlling apparatus described in the present application is not limited to the above terminal device or network device, and the structure of the neighbor cell measurement controlling apparatus can not be limited by FIG. 10. The neighbor cell measurement controlling apparatus can be stand-alone device or can be part of a larger device.

Figure 11:
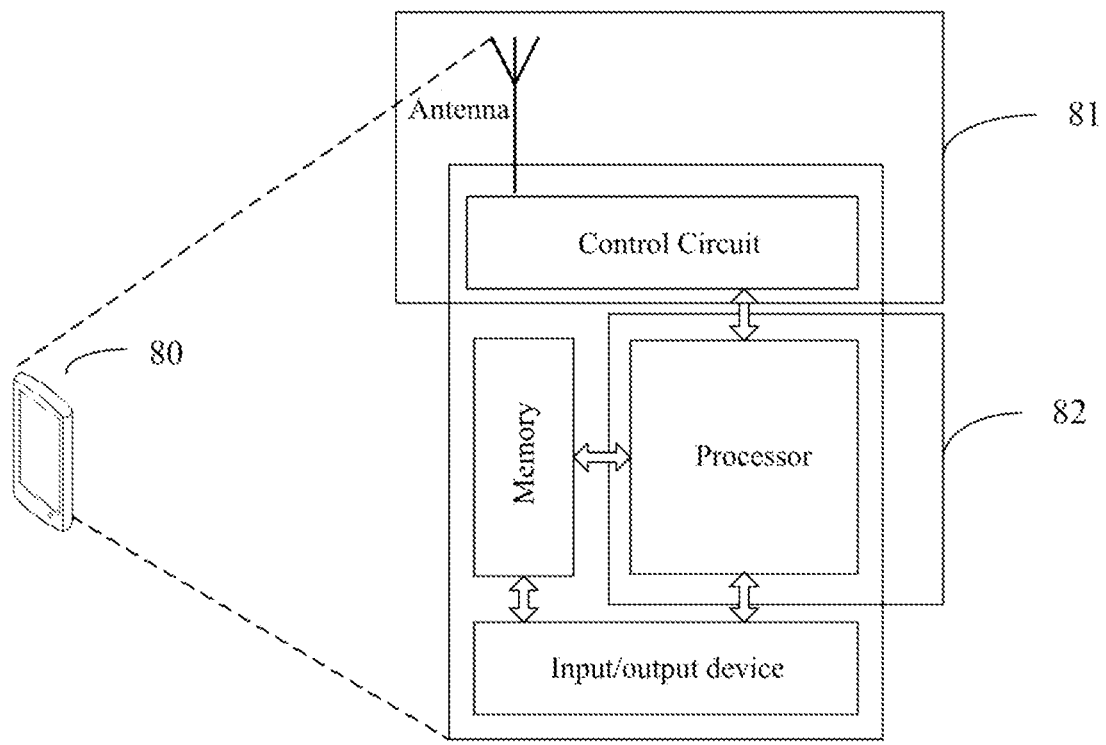
FIG. 11 is a schematic diagram of a structure of a terminal device provided by an embodiment of present application.

FIG. 11 is a schematic diagram of a structure of a terminal device provided by an embodiment of present application. The terminal device can be applicable to the terminal device described in each of the above embodiments of present application. For ease of illustration, FIG. 11 shows only the main components of the terminal device. As shown in FIG. 11, the terminal device 80 includes a processor, a memory, a RF circuit, an antenna, and an input/output device. The processor is mainly used for processing communication protocol and communication data, and for controlling the entire terminal, executing software program, and processing data of the software program. The memory is mainly used to store software program and data. RF circuits are mainly used for converting baseband signals with RF signals and for processing RF signals. The antenna is mainly used to transmit and receive RF signal in the form of electromagnetic wave. Input/output device, for example touch screen, display, keyboard, etc., are mainly used to receive data input from and output data to the user.

When the terminal device is turned on, the processor can read the software program in the storage unit, interpret and execute the instruction of the software program, and process the data of the software program. When it is necessary to transmit data wirelessly, the processor will output the baseband signal to the RF circuit after baseband processing of the data to be transmitted, and the RF circuit will transmit the RF signal outward in the form of electromagnetic wave through the antenna after RF processing of the baseband signal. When there is data transmitted to the terminal device, the RF circuit receives the RF signal through the antenna, converts the RF signal into a baseband signal, and outputs the baseband signal to the processor, and the processor converts the baseband signal into data and processes the data.

It will be understood by the person skilled in the art that for ease of illustration, FIG. 11 illustrates only a memory and processor. In a practical terminal, multiple processors and memories can exist. The memory can also be called storage medium or storage device, etc., which is not limited by the embodiments of the present application.

In one example, the antenna and control circuit with transceiving function can be considered as the transceiving module 81 of the terminal device 80, and the processor with processing function can be considered as the processing module 82 of the terminal device 80. As shown in FIG. 11, the terminal device 80 includes a transceiving module 81 and a processing module 82. The transceiving module 81 can also be referred to as a transceiving device, transceiver, transceiver apparatus, etc. In one possible implementation, the device used to implement the receiving function in the transceiving module 81 can be considered as the receiving module and the device used to implement the transmitting function in the transceiving module 81 can be considered as the transmitting module, i.e., the transceiving module 81 includes a receiving module and a transmitting module. Exemplarily, the receiving module can also be referred to as a receiving machine, receiver, receiving circuit, etc., and the transmitting module can be referred to as a transceiver, transceiving device, or transmitting circuit, etc.

An embodiment of present application further provides a communication system including: a terminal device as described in any of the method embodiments; and, a network device as described in any of the method embodiments.

An embodiment of present application further provides a readable storage medium, where the readable storage medium stores a computer program; the computer program, when being executed, implements the operation as described in any of the method embodiments.

An embodiment of present application further provides a program product, where the program product includes a computer program, the computer program is stored in a readable storage medium, the processor can read the computer program from the readable storage medium, and the processor executes the computer program to implement the operation of any of the above method embodiments.

It is understood by the person skilled in the art that all or some of the steps to implement each of method embodiments described above can be accomplished with hardware associated with program instruction. The foregoing program can be stored in a computer readable storage medium. The program, when executed, performs the steps including each of method embodiments described above; and the foregoing storage medium includes: ROM, RAM, disk or CD-ROM, and various other media that can store program code.

It should be understood that although the individual steps in the flowchart in the above embodiment are shown sequentially as indicated by the arrows, the steps are not necessarily performed sequentially in the order indicated by the arrows. Unless explicitly stated herein, these steps are performed in no strict order and they can be performed in any other order. Moreover, at least a portion of the steps in the figure can include a plurality of sub-steps or a plurality of stages, which are not necessarily executed and completed at the same moment, but can be executed at different moments, and the order of their execution is not necessarily sequential, but can be performed with other steps or at least a portion of the sub-steps or stages of other steps in turn or alternately.

Finally, it should be noted that the above embodiments are only used to illustrate the technical solutions of the present application, not to limit them; although the detailed illustration of the present application is performed with reference to the preceding embodiments, it should be understood by the person skill in the art that it is still possible to modify the technical solutions recorded in each of the preceding embodiments, or to equivalently replace some or all of the technical features therein; and these modifications or replacements do not make the essence of the corresponding technical solutions out of the scope of the technical solutions of each of embodiments of present application.

What is claimed is:

1. A neighbor cell measurement controlling method, applied to a terminal device, comprises following steps:
    S10, determining whether to update relaxed measurement information, wherein the updating the relaxed measurement information is used to reduce a difference between a threshold corresponding to the relaxed measurement information and a threshold corresponding to cell reselection information;
    S20, determining whether to perform neighbor cell measurement according to a serving cell measurement result and at least one of the determination result and the cell reselection information;
    wherein the step S10 comprises:
    determining to update the relaxed measurement information if a preset relaxed measurement updating condition is detected in a relaxed measurement;
    wherein the step S20 comprises:
    S21, updating the relaxed measurement information;
    S22, determining whether to perform the neighbor cell measurement according to the serving cell measurement result and at least one of the relaxed measurement information after being updated and the cell reselection information;
    wherein the step S21 comprises:
    updating the relaxed measurement information according to a preset step;
    wherein the preset step is determined according to a reselection threshold Q;
    wherein the updating the relaxed measurement information according to the preset step comprises:
    determining an intermediate value according to the preset step; and
    updating the relaxed measurement information according to the intermediate value;
    wherein the intermediate value is a product of the preset step and a preset value.

2. The method according to claim 1, wherein:
    the relaxed measurement information comprises N thresholds for different parameters, at least one threshold in the relaxed measurement information after being updated is greater than a threshold for a same parameter in the relaxed measurement information before being updated, wherein N is an integer greater than or equal to 1.

3. The method according to claim 1, wherein the updating the relaxed measurement information according to the intermediate value comprises:
    determining that a sum of a threshold for any parameter in the relaxed measurement information before being updated and the intermediate value is a threshold for a same parameter in the relaxed measurement information after being updated.

4. The method according to claim 1, wherein the relaxed measurement information comprises a relaxed measurement power threshold and a relaxed measurement quality threshold, and the method further comprises at least one of following:
    updating a relaxed measurement power threshold using a first preset value, wherein the preset value comprises the first preset value;

updating a relaxed measurement quality threshold using a second preset value, wherein the preset value comprises the second preset value.

5. The method according to claim 4, wherein the first preset value and the second preset value are different.

6. The method according to claim 1, wherein the preset relaxed measurement updating condition comprises at least one of following:
   a duration of the relaxed measurement is greater than or equal to a preset duration;
   a network condition of a serving cell meets a preset event triggering condition.

7. A neighbor cell measurement controlling method, applied to a network device, comprises:
   S100, determining a network configuration parameter, wherein the network configuration parameter comprises control information, which is used to update relaxed measurement information;
   S200, transmitting the network configuration parameter so that a terminal device which receives the network configuration parameter determines whether to perform a neighbor cell measurement based on the control information;
   wherein the step of the terminal device determining whether to update relaxed measurement information comprises: determining to update the relaxed measurement information if a preset relaxed measurement updating condition is detected in a relaxed measurement;
   wherein the step of the terminal device determining whether to perform the neighbor cell measurement based on the control information comprises: updating the relaxed measurement information; and determining whether to perform the neighbor cell measurement according to a serving cell measurement result and at least one of the relaxed measurement information after being updated and cell reselection information;
   wherein the updating the relaxed measurement information is used to reduce a difference between a threshold corresponding to the relaxed measurement information and a threshold corresponding to the cell reselection information;
   wherein the updating the relaxed measurement information comprises:
   updating the relaxed measurement information according to a preset step;
   wherein the preset step is determined according to a reselection threshold Q;
   wherein the updating the relaxed measurement information according to the preset step comprises:
   determining an intermediate value according to the preset step; and
   updating the relaxed measurement information according to the intermediate value;
   wherein the intermediate value is a product of the preset step and a preset value.

8. A communication device, comprising: a memory and a processor;
   the memory is used to store program instruction;
   the processor is used to call program instruction in the memory to perform the method according to claim 1.

9. A communication device, comprising: a memory and a processor;
   the memory is used to store program instruction;
   the processor is used to call program instruction in the memory to perform the method according to claim 7.

10. A communication system, comprising:
    a terminal device for implementing the following steps:
    determining whether to update relaxed measurement information, wherein the updating the relaxed measurement information is used to reduce a difference between a threshold corresponding to the relaxed measurement information and a threshold corresponding to cell reselection information;
    determining whether to perform neighbor cell measurement according to a serving cell measurement result and at least one of the determination result and the cell reselection information;
    wherein the determining whether to update relaxed measurement information comprises:
    determining to update the relaxed measurement information if a preset relaxed measurement updating condition is detected in a relaxed measurement;
    wherein the determining whether to perform neighbor cell measurement according to a serving cell measurement result and at least one of the determination result and the cell reselection information comprises:
    updating the relaxed measurement information;
    determining whether to perform the neighbor cell measurement according to the serving cell measurement result and at least one of the relaxed measurement information after being updated and the cell reselection information;
    wherein the updating the relaxed measurement information comprises:
    updating the relaxed measurement information according to a preset step;
    wherein the preset step is determined according to a reselection threshold Q;
    wherein the updating the relaxed measurement information according to the preset step comprises:
    determining an intermediate value according to the preset step; and
    updating the relaxed measurement information according to the intermediate value;
    wherein the intermediate value is a product of the preset step and a preset value; and
    a network device for implementing the following steps:
    determining a network configuration parameter, wherein the network configuration parameter comprises control information, which is used to update relaxed measurement information;
    transmitting the network configuration parameter so that a terminal device which receives the network configuration parameter determines whether to perform a neighbor cell measurement based on the control information;
    wherein the step of the terminal device determining whether to update relaxed measurement information comprises: determining to update the relaxed measurement information if a preset relaxed measurement updating condition is detected in a relaxed measurement;
    wherein the step of the terminal device determining whether to perform the neighbor cell measurement based on the control information comprises: updating the relaxed measurement information; and determining whether to perform the neighbor cell measurement according to a serving cell measurement result and at least one of the relaxed measurement information after being updated and cell reselection information;
    wherein the updating the relaxed measurement information is used to reduce a difference between a threshold corresponding to the relaxed measurement information and a threshold corresponding to the cell reselection information;

wherein the updating the relaxed measurement information comprises:

updating the relaxed measurement information according to a preset step;

wherein the preset step is determined according to a reselection threshold Q;

wherein the updating the relaxed measurement information according to the preset step comprises:

determining an intermediate value according to the preset step; and updating the relaxed measurement information according to the intermediate value;

wherein the intermediate value is a product of the preset step and a preset value.

11. A non-transitory readable storage medium, wherein the readable storage medium stores a computer program stored thereon; the computer program, when being executed, implements the method according to claim 1.

* * * * *